L. L. CARPENTER.
AGRICULTURAL MACHINE.
APPLICATION FILED OCT. 28, 1913.
1,116,011.
Patented Nov. 3, 1914.
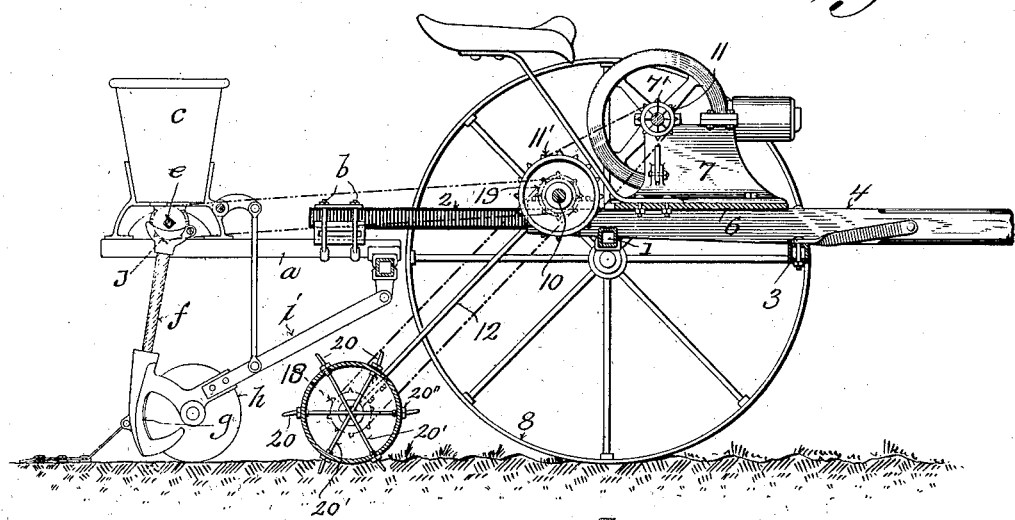
Fig. 1.
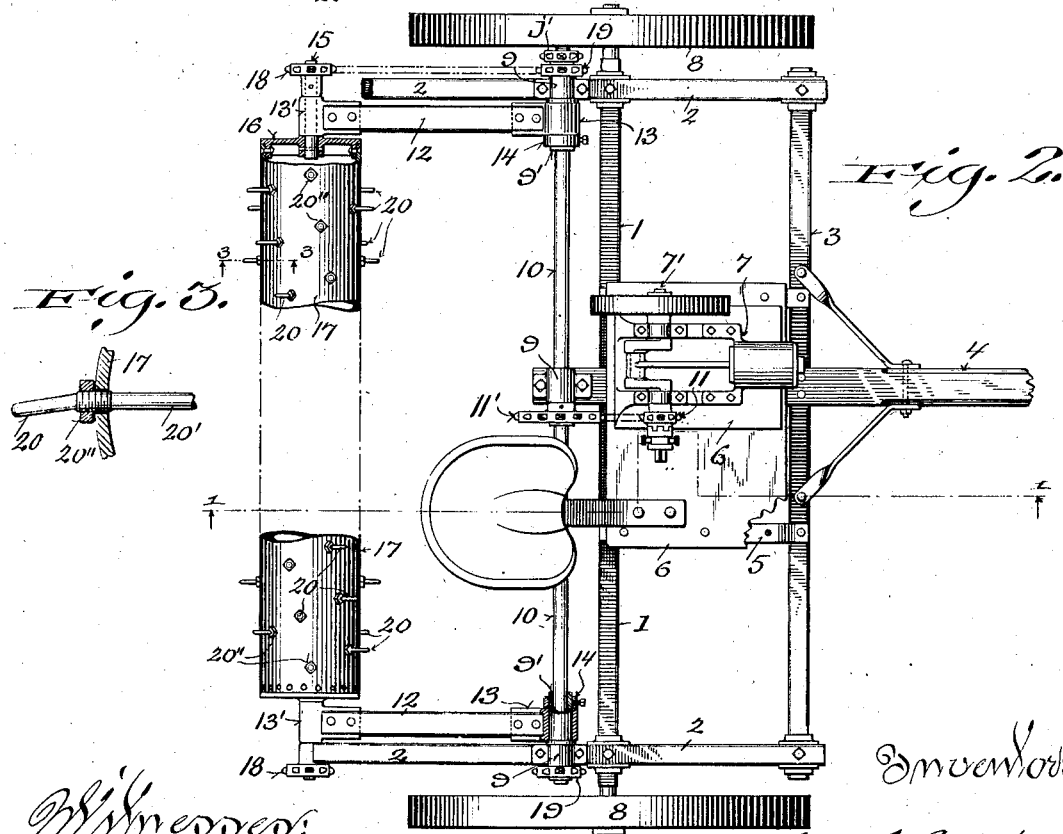
Fig. 2.
Fig. 3.
Witnesses:
Inventor:
Leroy L. Carpenter
By Oliphant & Young
Attorneys.

UNITED STATES PATENT OFFICE.

LEROY L. CARPENTER, OF OMRO, WISCONSIN.

AGRICULTURAL MACHINE.

1,116,011.        Specification of Letters Patent.        Patented Nov. 3, 1914.

Application filed October 28, 1913. Serial No. 797,824.

*To all whom it may concern:*

Be it known that I, LEROY L. CARPENTER, a citizen of the United States, and resident of Omro, in the county of Winnebago and State of Wisconsin, have invented certain new and useful Improvements in Agricultural Machines; and I do hereby declare that the following is a full, clear, and exact description thereof.

My invention refers to agricultural machines, its primary object being to provide a simple, economical and effective machine for conditioning the soil, and a further object is to provide means whereby a standard type of seeder may be attached to said machine to thus render it possible to prepare the soil and seed in one operation.

In carrying out my invention the essential feature resides in the employment of a motor-driven toothed drum arranged to rotate in the same direction as that traveled by the machine but at a higher speed relative to the latter. Thus the independently driven drum breaks up the sod and clods, leaving the same in a smooth pulverized condition preparatory to seeding, while at the same time the auxiliary driving power applied to the drum tends to assist in propelling the animal drawn machine, relieving the draft strain upon said animals, whereby the seeder attachment can be employed without overloading the team.

With the above and other objects in view the invention consists in certain peculiarities of construction and combination of parts as set forth hereinafter with reference to the accompanying drawings and subsequently claimed.

In the drawings Figure 1 represents a longitudinal sectional elevation of a machine embodying the features of my invention, the same being shown provided with a seeder attachment; Fig. 2, a plan view of the same with parts broken away and parts in section with the seeder attachment removed, and Fig. 3, a detailed cross-section of a portion of the drum upon an enlarged scale showing my preferred method of attaching the teeth thereto.

Referring by characters to the drawings, 1 represents the axle of a truck-frame composed of parallel side sills 2, which side sills are supported by and secured to the axle and are also cross-connected by a transversely disposed front sill 3, the same, together with the axle, serving as a support for the draft tongue 4. The axle and front sill also have connected thereto bridge-bars 5, upon which is secured a platform 6 for the support of a motor 7, which motor in this exemplification of my invention, is in the form of an internal combustion engine. The axle has loosely mounted thereon a pair of ordinary truck-supporting wheels 8 and the side sills 1 and tongue 4 are provided with alined boxes 9 for the reception of a power-shaft 10, the sill-boxes being provided with inwardly extending bearing-sleeves 9'. The crank-shaft 7' of the motor 7 carries a clutch-controlled sprocket-wheel 11, which sprocket-wheel is in link-belt connection with a larger sprocket-wheel 11', the same being secured to the power-shaft 10 and through which gear connection the power is applied thereto from the motor. The sleeve extensions 9' of the boxes 9 serve as supports for the ends of oscillatory arms 12. These arms are composed of thin metallic strips arranged with their flat faces disposed horizontally, whereby a slight flexure will result, co-incident to strain. The upper and lower ends of the arms 12 have secured thereto metallic hubs 13, 13', respectively. The upper hubs 13 are loosely fitted over the sleeves 9' and are held against lateral play by means of set-collars 14, which set-collars are secured to said sleeve extensions. The lower boxes 13' of the arms serve as journals for trunnions 15, which trunnions extend from metallic heads 16 of a rotatory hollow drum 17, the ends of the drum-shell being fitted over circular webs of the heads and secured thereto. The trunnions carry sprocket-wheels 18, which sprocket-wheels are connected by link-belts to corresponding sprocket-wheels 19 that are secured to the ends of the power-shaft 10. The drum is provided with series of teeth 20, preferably disposed about its surface in spiral form, as shown, whereby the teeth are adapted to enter the soil progressively from end to end throughout the drum, it being understood that said drum is arranged to travel upon the surface of the soil and its teeth serve to cut up the same, reducing lumps of earth and masses of sod, whereby a raking and pulverizing effect is had.

As best shown in the detail view, Fig. 3, each pair of teeth is formed from a single rod 20', which rod extends through diametrically opposite apertures in the drum-shell. Each rod at the base of the teeth is formed with a threaded section for the reception of binding nuts 20'', whereby the tooth extensions are firmly held in position and, owing to the draw of the opposite nuts, the drum is slightly contracted to insure rigidity in opposition to impact. It is also understood that, should it be desired, the hollow drum may be filled or partly filled with any suitable material to increase its weight. Attention is also called to the fact that the teeth 20 are disposed at a slight tangent relative to the drum axis, being inclined rearwardly of the direction of travel of the drum, whereby they to a certain extent, act as beaters. As shown, the rear ends of the sidesills 1 are extended to form supports for the frame $a$ of a seeder, the frame, in this instance, being shown secured to the sills by clip-bolts $b$, although it is understood that I may, without departing from the spirit of my invention, employ any well-known means for attaching the seeder mechanism. The seeder illustrated is of a standard type of machine comprising a seed-box $c$ having feed cups $d$ attached thereto and the usual feed-shaft $e$ extending through the series of feed-cups. Each cup has extending therefrom flexible tube $f$ which is adapted to discharge into a boot $g$ carrying a disk $h$ and a standard drag-bar $i$, there being one of such drag-bars for each seeder mechanism. This type of seeder is usually supported by wheels and it is proposed in this instance to remove the wheels of the seeder and couple the frame thereof to the rear ends of the sills $l$, whereby my device may be utilized for both preparing the soil and seeding the same. It is also apparent that any other type of seeder other than that shown may be attached to the machine. The feed-shaft $e$ of the seeder-cups carries the usual sprocket-wheel $j$, which sprocket-wheel is in link belt connection with a corresponding sprocket-wheel $j'$ that is secured to one end of the power-shaft. In this instance the said sprocket-wheel is shown integral with the adjacent drum driving sprocket-wheel 19.

From the foregoing description it is obvious that, as the machine is drawn over the surface by a team, power being applied to the shaft 10 will cause the drum to rapidly rotate in the same direction as that traveled by said machine, its rotation being accelerated over the speed of travel, whereby the soil will be subjected to a grinding or pulverizing action coincident to the rapid revolution of the drum teeth and thus said soil is thoroughly ground and pulverized. Should the drum travel over clods or other obstructions, adjacent to either end, it is also apparent that said end is capable of upward yield to produce a compensating effect due to the flexure of the supporting arms which carry said drum and hence the working surface of the drum is at all times held to its work by gravity. The traction of the drum in traveling through the soil also serves as an auxiliary drive in assisting the draft animals, due to forward thrust of the drum arms which are suspended from the machine. It is also manifest that when the seeder attachment is in place, it will perform its functions due to the gear connection between said seeder and power-shaft 10. Hence by arranging the mechanism in such manner that a dismantled seeder can be supported upon its rear end, the utility of the machine is effectually increased. It will also be apparent that the motor can be removed from its platform and utilized as a motive force for the various machines employed about a farm or for pumping.

While I have shown and described a machine and various details of construction relative to carrying out my invention, it is understood that I may, without departing from the spirit of my invention, vary such details within the knowledge of skilled mechanics as, for example, the frame construction may be changed to suit certain conditions as well as the materials employed.

I claim:

1. A machine of the character described comprising a wheel-supported truck arranged to be drawn by animals, boxes secured to the truck having sleeve extensions, a motor-driven shaft mounted within the boxes, yieldable arms provided with hubs at their opposite ends, one set of said hubs being loosely mounted upon the box sleeves, a toothed drum provided with trunnions revolubly mounted within the other set of arm hubs, sprocket-gear-wheels secured to the ends of the drive shaft and drum-trunnions, and link-belts connecting the sets of sprocket-wheels.

2. A machine of the character described comprising a wheel-supported truck arranged to be drawn by animals, boxes secured to the truck having sleeve extensions, a motor-driven shaft mounted within the boxes, yieldable arms provided with hubs at their opposite ends, one set of said hubs being loosely mounted upon the box sleeves, a toothed drum provided with trunnions revolubly mounted within the other set of arm hubs, and a gear connection between the drive shaft and drum trunnions.

In testimony that I claim the foregoing I have hereunto set my hand at Omro in the county of Winnebago and State of Wisconsin in the presence of two witnesses.

LEROY L. CARPENTER.

Witnesses:
L. P. JENSEN,
M. L. WARE.